Figure 1:
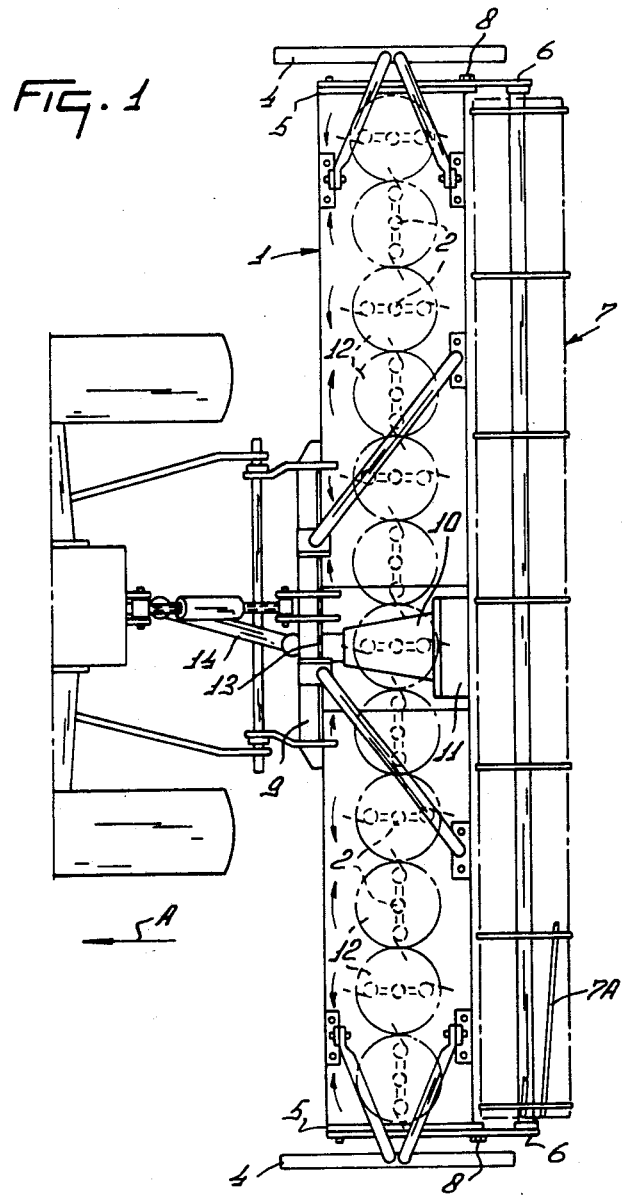

United States Patent [19]
van der Lely

[11] 4,060,134
[45] Nov. 29, 1977

[54] SOIL CULTIVATING IMPLEMENTS

[76] Inventor: Cornelis van der Lely, 7, Bruschenrain, Zug, Switzerland

[21] Appl. No.: 674,166

[22] Filed: Apr. 6, 1976

[30] Foreign Application Priority Data

Apr. 11, 1975 Netherlands .................. 7504320

[51] Int. Cl.² ............................................. A01B 33/14
[52] U.S. Cl. ....................................... 172/59; 172/96; 172/543
[58] Field of Search .................. 172/49, 59, 96, 91, 172/522, 523, 526, 543, 45, 51, 111; 56/400, 375, 295

[56] References Cited

U.S. PATENT DOCUMENTS

| 3,667,551 | 6/1972 | Lely | 172/59 |
| 3,765,491 | 10/1973 | Lely | 172/96 |
| 3,897,831 | 8/1975 | Lely | 172/59 |

Primary Examiner—Richard J. Johnson
Attorney, Agent, or Firm—Mason, Mason & Albright

[57] ABSTRACT

A soil cultivating implement with a row of soil working members extending transverse to the direction of travel is constructed to work a broad path of soil but with less than normal power input. Each soil working member has a support with a tine holder at each side of its axis of rotation. Rigid tines extend downwardly from the holders to work the subsoil and further tines are mounted on each holder to work only the top soil, above the rigid tines. The rigid tines are positioned closer to the axis of rotation than are the further tines and only the latter of adjacent soil working members work overlapping paths. The further tines can be of resilient, circular construction and connected to a holder by respective integral spring coils that are interconnected by a tie portion. The further tines and their coils are located at the upper and lower ends of the holder and secured to the holder by the same fastening that secures the rigid tine in that holder. The fastening can be a clamping plate and protective screen.

8 Claims, 4 Drawing Figures

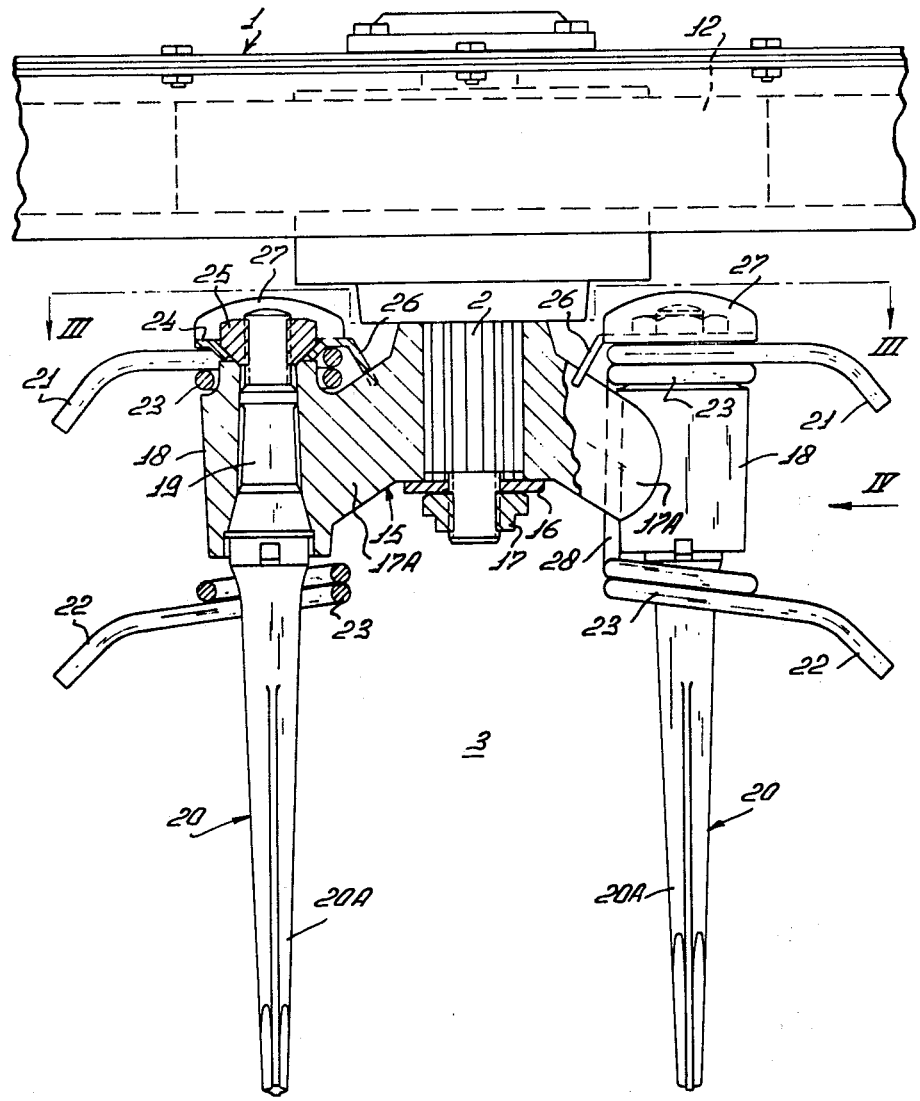

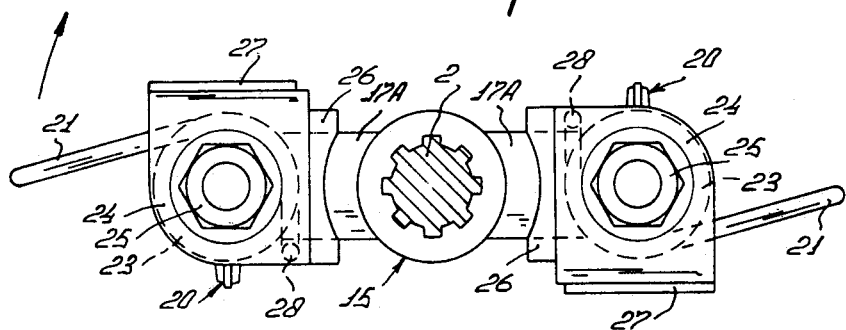
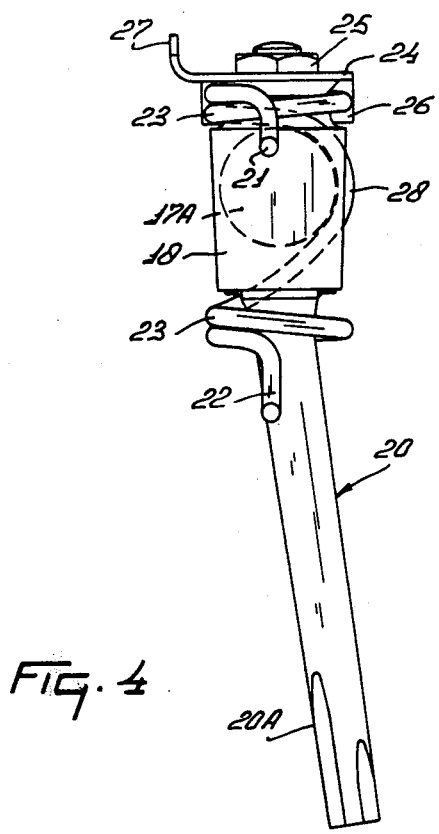

SOIL CULTIVATING IMPLEMENTS

For a better understanding of the invention, and to show how the same may be carried into effect, reference will now be made, by way of example, to the accompanying drawings, in which:

FIG. 1 is a diagrammatic plan view of a soil cultivating implement in accordance with the invention connected to the rear of an agricultural tractor, FIG. 2 is a part-sectional elevation, to an enlarged scale, and principally illustrates the construction and mounting of one soil working or cultivating member of the implement of FIG. 1, FIG. 3 is a section taken on the line III— III in FIG. 2, and FIG. 4 is an elevation as seen in the direction indicated by an arrow IV in FIG. 2 but illustrates only those parts that are shown, unsectioned, immediately to the left of the arrow IV.

Referring to the accompanying drawings, the soil cultivating implement that is illustrated is in the form of a rotary harrow and comprises a hollow box-shaped frame portion 1 that extends substantially horizontally transverse, and normally substantially horizontally perpendicular, to the intended direction of operative travel of the implement which is indicated by an arrow A in FIG. 1. The frame portion 1 rotatably supports a plurality (in this case, twelve) of vertical or substantially vertical shafts 2 that are spaced apart from one another along said frame portion at regular intervals which conveniently, but not essentially, have magnitudes of substantially 25 centimeters. Each shaft 2 projects from beneath the bottom of the frame portion 1 and is there provided with a corresponding soil working or cultivating member 3, the construction and arrangement of the members 3 being further described below. The members 3 extend in a single row that is substantially horizontally perpendicular to the direction A and, beyond the opposite ends of that row, substantially vertically disposed shield plates 4 are arranged in parallel relationship with the direction A, each shield plate 4 being turnable upwardly and downwardly, to match undulations in the surface of the ground that its lower edge may meet during operative progress in the direction A, about a corresponding substantially horizontal axis that is substantially parallel to the direction A and that is afforded by corresponding pivots mounted on top of the frame portion 1 at a short distance inwardly towards the center of the implement from the end of the frame portion 1 concerned. The shield plates 4 minimise ridging of the soil at the opposite edges of the broad strip of land which the members 3 cultivate during the use of the implement and also act substantially to prevent stones and like potentially dangerous items from being flung laterally from the path of travel of the implement by its rapidly rotating soil working or cultivating members 3.

The opposite ends of the hollow frame portion 1 are closed by corresponding sector-shaped plates 5 and arms 6 are turnable upwardly and downwardly alongside those plates 5 about a substantially horizontal axis that is afforded by aligned strong pivots located at the tops and fronts of the end plates 5 with respect to the direction A. The arms 6 extend rearwardly from their pivotal mountings and their rear ends, which project beyond the plates 5, are inclined downwardly. Horizontally aligned bearings that are carried at substantially the rearmost ends of the arms 6 rotatably connect a supporting member 7, in the form of an open ground roller, to the arms 6 and thus indirectly to the frame 1. The rotatable supporting member 7 comprises a central, preferably tubular, member to which a plurality (such as seven) of generally circular vertically disposed plates are secured at regular intervals along the length thereof. Peripheral regions of the vertical plates are formed with holes through which a plurality of elongated rod- or tube-formation elements 7A are entered at regularly spaced apart angular intervals around the axially disposed central member, said elements 7A preferably, as illustrated, being wound helically around the axis of rotation of the member 7 to some extent. If desired, the elements 7A may extend substantially parallel to the longitudinal axis/axes of rotation of the member 7. The arms 6 by which the member 7 is connected to the frame 1 are turnable upwardly and downwardly about the aligned pivots at the tops and fronts of the end plates 5 and are provided with bolts 8 that can be entered in chosen ones of curved rows of holes that are formed alongside the rear curved edges of the sector-shaped end plates 5 at equal distances from the axis defined by said strong pivots. The particular holes that are chosen for cooperation with the bolts 8 determine the level of the axis of rotation of the supporting member 7 relative to the frame, this being a principal factor in determining the maximum depth of penetration of the soil working or cultivating members 3 into the ground which is possible during the use of the implement. If preferred, substantially horizontal locking pins can be substituted for the bolts 8 but the use of bolts usually provides a more rigid assembly when said bolts are tightened.

A generally triangular coupling member or trestle 9 is secured to the front of the frame portion 1 substantially midway across the width of the implement and is constructed and arranged for connection to the three-point lifting device or hitch at the rear of an agricultural tractor or other operating vehicle in a manner that is generally known per se. As can be seen in FIG. 1 of the drawings, strengthening tie beams interconnect an upper region of the coupling memember or trestle 9 and spaced anchorages at the top and rear of the frame portion 1 with respect to the direction A. One of the center pair of shafts 2 of the single row thereof has an upward extension into a gear box 10 that is mounted on top of the hollow frame portion 1 immediately to the left of the center of that frame portion when the latter is viewed from the rear in the direction A. A bevel pinion carried by the shaft extension has its teeth in mesh with those of a second bevel pinion carried by a shaft that is not visible in the drawings but that is substantially horizontally parallel to the direction A. The rearmost end of this shaft extends into a change-speed gear 11 at the back of the gear box 10 together with the rearmost end of an overlying and parallel shaft 13. The two shaft ends that project into the change-speed gear 11 are splined or otherwise keyed to receive co-operating pairs of straight- or spur-toothed pinions in an interchangeable and/or exchangeable manner. It is not necessary to describe the construction of the change-speed gear 11 in detail for the purposes of the present invention and it suffices to say that the pinion arrangement which is selected for use in the change-speed gear 11 governs the transmission ratio between the shaft 13 and the underlying parallel shaft that is not visible in the drawings and thus the speed at which the shafts 2 and members 3 will rotate, during the use of the implement, in response to a substantially standard input speed of rotation to the gear box 10. The leading end of the shaft 13 projects forwardly from the gear box 10 in substantially the direction A and is there splined or otherwise keyed to enable it to be placed in driven connection with the power take-off shaft of an agricultural tractor or other operating vehicle through the intermediary of a telescopic transmission shaft 14 that is of a construction which is known per se having universal joints at its opposite ends. Each of the shafts 2 is provided, inside the hollow frame portion 1, with a corresponding straight-toothed or spur-toothed pinion 12 and it will be seen from FIGS. 1 and 2 of the drawings that the teeth of each pinion 12 are in mesh with those of its neighbour, or of both of its neighbours, in the single row thereof so that, when the implement is in operation, the pinions 12 and the corresponding shafts 2 and soil working or cultivating members 3 will rotate in the directions that are indicated by small arrows in FIG. 1 of the drawings, the direction of rotation of each pinion 12 being opposite to that of its neighbour, or both of its neighbours, in the row.

FIGS. 2, 3 and 4 of the drawings illustrate the construction and arrangement of one of the shafts 2 and the corresponding soil working or cultivating member 3 in greater detail. It will be seen that, beneath a substantially vertical bearing at the bottom of the frame portion 1, the shaft 2 is externally splined for co-operation with internal splines in a central bore formed in a support 15 of the corresponding member 3. The shaft 2 terminates, beneath the splined portion thereof, in a short screw-threaded portion of reduced diameter and the support 15 is maintained axially in position on the shaft 2 by a washer 16 and a nut 17 which is screwed tightly onto the threaded portion of the shaft 2. The support 15 comprises two arms 17A that both project outwardly and downwardly away from a central region or hub of the support 15, the two arms 17A extending in radially opposite directions from said central region or hub when the member 15 is viewed in a direction parallel to the axis of rotation of the corresponding shaft 2(see FIG. 3). The outer or free end of each arm 17A integrally carries a corresponding sleeve-shaped tine holder 18 whose axis substantially vertically parallel to that of the corresponding shaft 2. Each holder 18 receives a fastening portion 19 of a corresponding rigid tine 20, the longitudinal axis of each fastening portion 19 thus also being substantially parallel to the axis of rotation of the corresponding shaft 2 and member 3. Each rigid tine 20 also includes a downwardly tapering soil working portion 20A whose upper end is integrally connected to the lower end of the corresponding fastening portion 19 in such a way that the longitudinal axes of said two portions 19 and 20A are inclined to one another at a small angle which preferably, but not essentially, has a magnitude of substantially 8°. It will be seen from FIGS. 3 and 4 of the drawings that the fastening portion 19 of each tine 20 is so arranged in the corresponding holder 18 that the corresponding soil working portion 20A is inclined rearwardly from top to bottom with respect to the intended direction of rotation of the corresponding member 3 (see the arrow at the left-hand side of FIG. 3) so that each portion 20A may be considered as being in gently trailing relationship with that direction of rotation.

In addition to firmly but releasably carrying the fastening portion 19 of one of the rigid tines 20, each holder 18 also serves as a carrier for a corresponding pair of laterally extending (with respect to the corresponding shaft 2) resiliently supported upper and lower tines 21 and 22 that are in vertically spaced apart relationship with one another. The radially inner end of each of the upper and lower tines 21 and 22 is integrally connected to one end of a corresponding helical coil 23 that, in the embodiment that is being described by way of example, has a diameter of substantially 45 millimeters. The coil 23 that corresponds to each upper resiliently supported tine 21 extends at least partly around a neck of reduced diameter that is formed in the external surface of the corresponding holder 18 close to the uppermost end of that holder. An upper screw-threaded part of each tine fastening portion 19 projects from above the upper end of the bore through the corresponding holder 18 and there co-operates with a corresponding clamping plate 24 that has a frusto-conically tapering recess and with a corresponding fastening nut 25 which is screwed onto said part of the fastening portion 19 and which has a downwardly directed frustoconical surface that matches, and abuts against, the surface of the frusto-conical recess in the clamping plate 24. That side of each clamping plate 24 that faces towards the corresponding shaft 2 is formed with a downwardly inclined broad tongue 26 whose lowermost end has a concave recess that fits over the convexly curved upper surface of the corresponding arm 17A. Moreover, at its front with respect to the intended direction of operative rotation of the corresponding member 3, each clamping plate 24 has an upright guard rim 27 that is thus disposed immediately in advance of the corresponding nut 25 and the screw-threaded part of the corresponding tine fastening portion 19 with which that nut 25 co-operates, relative to the intended direction of operative rotation of the corresponding member 3 (see FIG. 3) so as to shield said nut 25 and co-operating screw-threaded part from being directly struck by stones and other potentially damaging articles that may be met with by the member 3 when it is rapidly rotating in the use of the implement.

The helical coil 23 that corresponds to each lower resiliently supported tine 22 is wound around the upper end of the corresponding soil working tine portion 20A immediately below the integral junction of that portion 20A with the corresponding fastening portion 19 and thus immediately below the bottom of the corresponding holder 18. Both the upper and lower helical coils 23 surround with some clearance the parts which they are wound around and, in the embodiment which is being described, each pair of upper and lower resiliently supported tines 21 and 22 is formed integrally from a single length of spring steel rod or other resilient material of circular cross-section that preferably has a diameter of substantially 9 millimeters. It can be seen in FIGS. 2 to 4 of the drawings that the coils 23 which corresponds to each integral pair of resiliently supported tines 21 and 22 have their ends that are remote from direct connections with those tines 21 and 22 integrally interconnected by a curved tie portion 28 that is bent around the side of the corresponding arm 17A which faces rearwardly with respect to the intended direction of operative rotation of the corresponding soil working or cultivating member 3. Thus, each tie portion 28 lies generally between the corresponding holder 18 and the shaft 2 to which the member 3 concerned is secured.

Each resiliently supported upper tine 21 extends substantially horizontally away from its integral connection to the corresponding upper coil 23 and terminates in an obliquely downwardly directed outer end (see particularly FIG. 2). Each resiliently supported lower tine 22, on the other hand, extends away from its integral junction with the corresponding lower coil 23 by way of a substantially straight portion that is inclined outwardly and downwardly at a few degrees to the horizontal, each tine 22 also terminating in an obliquely downwardly and outwardly directed outer end that is, however, slightly less steeply inclined to the horizontal than is the outer end of the corresponding upper tine 21 (see FIG. 2).

The circular paths that are traced by the tips of the resiliently supported tines 21 and 22 of each soil working or cultivating member 3 during rotation of that member 3 overlap the paths that are traced by the corresponding tines of the or each immediately neighbouring member 3 whereas the circular paths that are traced by the tips of the soil working portions 20A of the rigid tines 20 of immediately neighbouring members 3 do not overlap one another when those members 3 are revolving. It will be noted from FIG. 3 of the drawings that, with respect to the intended direction of operative rotation of each member 3, both the upper and lower tines 21 and 22 are inclined rearwardly from root to tip from their integral connections with the corresponding coils 23 so as to trail to some extent relative to the corresponding directions of rotation. Moreover, as seen in FIG. 3 of the drawings, the tines 21 and 22 at opposite sides of the shaft 2 are in parallel or substantially parallel relationship with one another.

In the use of the rotary harrow that has been described, its coupling member or trestle 9 is connected to the three-point lifting device or hitch of an agricultural tractor or other operating vehicle in the generally known manner that is illustrated in outline in FIG. 1 of the drawings and the leading end of the substantially horizontal shaft 13, which constitutes a rotary input shaft of the gear box 10, is placed in driven connection with the power take-off shaft of the same tractor or other vehicle by way of the intermediate telescopic transmission shaft 14 that has universal joints at its opposite ends. As the implement moves over a field that is to be cultivated in the direction A, the soil working or cultivating members 3 are rotated in the directions that are indicated by small arrows in FIG. 1 of the drawings and by a single arrow (in respect of one member 3) in FIG. 3 of the drawings, operative portions of the members 3 that are constituted by their resiliently supported tines 21 and 22 working overlapping strips of soil to produce, in effect, a single broad strip of worked soil throughout substantially the whole of the path of travel of the implement. The rigid tines 20 of the members 3, on the other hand, work strips of soil that are individual to each member 3 and that effectively do not overlap, each such strip having a width of between substantially 15 and substantially 20 centimeters. The operative portions of the members 3 that are afforded by the resiliently supported tines 21 and 22 project laterally from the holders 18 and are deflectable against resilient opposition about axes that substantially coincide with the longitudinal axes of the corresponding holders 18 and rigid tine fastening portions 19.

It is not necessary, with the implement that has been described, that the rigid tines 20 of the soil working or cultivating members 3 should work overlapping strips of soil because the laterally extending resiliently supported tines 21 and 22 which are located generally above the soil working portions 20A of the rigid tines 20 are effective in producing a thorough crumbling of the top soil or at least of an upper layer of that top soil. The downwardly projecting rigidly supported tine portions 20 A, on the other hand, move through the sub-soil, and/or through deeper layers of the top soil, and perform a cultivating action thereupon that is sufficient to produce a satisfactory result. The fact that the strips of soil that are worked by the rigid tines 20 of successively adjoining members 3 do not overlap one another means that, where a deep cultivation is to be performed on heavy soil that is in a wet condition, less power is necessary to cultivate that soil to a satisfactory extent than would be required with an overlapping arrangement, the top soil, or uppermost layer of the top soil, nevertheless being thoroughly crumbled by the tines 21 and 22 of the members 3 because the tips of those tines trace circular paths during rotation about the axes of the shafts 2 and the circular paths corresponding to successive members 3 in the row overlap one another. The crumbled top soil is substantially uniformly distributed through the working width of the implement and the rotatable supporting member 7 which immediately follows the members 3 over the land, in addition to performing its supporting function, gently compresses and smooths the cultivated top soil, its elements 7A acting to crush any lumps of soil that may have been left upon the surface by the members 3. As will be evident from FIG. 1 of the drawings, the rotatable supporting member 7 extends throughout substantially the whole of the working width of the twelve members 3.

Although various features of the soil working implement that have been described and/or that are illustrated in the accompanying drawings will be set forth in the following claims as inventive features, it is emphasised that the invention is not necessarily limited to those features and that it includes within its scope each of the parts of the soil cultivating implement that has been described, and/or that is illustrated in the accompanying drawings both individually and in various combinations.

What we claim is:

1. A soil cultivating implement comprising a frame and a plurality of adjacent soil working members rotatably supported on said frame, said members being rotatable about corresponding upwardly extending axes and driving means engaging said members to rotate same and work soil, each of said members comprising a support and at least one downwardly extending substantially rigid tine fastened to said support, said tine having an upper fastening portion and a lower soil working portion, said fastening portion being held in a holder adjacent an outer end of said support, further soil working tine means deflectively mounted on said soil working member and rotatable therewith, said further tine means being fastened to said holder by at least one spring coil that surrounds said holder, the tine means of adjacent soil working members cooperating to work overlapping paths of soil during operation, and said tine means being deflectable against the resilient opposition of said coil and turnable about an axis that is substantially parallel to the axis of rotation of the corresponding soil working member.

2. An implement as claimed in claim 1, wherein said further tine means comprises two further tines that are vertically spaced apart from one another on said holder.

3. A soil cultivating implement comprising a frame and a plurality of adjacent soil working members rotatably supported on said frame, said members being rotatable about corresponding upwardly extending axes and driving means engaging said members to rotate same and work soil, each of said members comprising a support and at least one downwardly extending, substantially rigid tine fastened to said support, said tine having an upper fastening portion and a lower soil working portion, said fastening portion being held in an elongated holder adjacent an outer end of said support, further soil working tine means deflectively mounted on said soil working member and rotatable therewith, the further tines being fastened to said holder by spring coil means that surrounds said holder and comprising an upper tine positioned adjacent the upper side of the holder and a lower tine located adjacent the lower side of the holder, the further tines of adjacent soil working members cooperating to work overlapping paths of soil during operation, said further tines being deflectable against the resilient opposition of said coil means and turnable about an axis that substantially coincides with the longitudinal axis of said holder.

4. An implement as claimed in claim 3, wherein said further tines extend outwardly from said holder in substantial vertical alignment with one another.

5. A soil cultivating implement comprising a frame and a plurality of adjacent soil working members rotatably supported on said frame, said members being rotatable about corresponding upwardly extending axes and driving means engaging said members to rotate same and work soil, each of said members comprising a support and at least one downwardly extending, substantially rigid tine fastened to said support, said tine having an elongated upper fastening portion and a lower soil working portion, said fastening portion being held in a holder adjacent an outer end of said support, further soil working tine means deflectively mounted on said soil working member and rotatable therewith, said further tine means comprising an upper tine and a lower tine which are each fastened to said holder by at least one corresponding spring coil that surrounds the holder, the further tine means of adjacent soil working members being positioned to cooperate and work overlapping paths of soil during operation, the coil of said upper tine being located adjacent the upper side of the holder and the coil of said lower tine being located adjacent the lower side of the holder, each further tine being deflectable against resilient opposition of its coil about an axis that substantially coincides with the longitudinal axis of said fastening portion of the rigid tine.

6. An implement as claimed in claim 5, wherein said further tines extend outwardly from said holder in generally radial directions.

7. A soil cultivating implement comprising a frame and a plurality of adjacent soil working members rotatably supported on said frame, said members being rotatable about corresponding upwardly extending axes and driving means engaging said members to rotate same and work soil, said members each comprising a substantially horizontal support and at least one downwardly extending substantially rigid tine fastened in a holder at an outer end of said support, said tine comprising an elongated upper fastening portion secured in said holder by fastening means and a lower soil working portion, further tine means connected to said support and including two deflectable tines that extend outwardly from said holder with respect to the axis of rotation of the corresponding soil working member, said two tines being turnable about an axis that is substantially coincident with the longitudinal axis of said fastening portion and being connected to said holder by at least one spring coil that surrounds that holder, an upper one of said two tines being located near the upper side of said holder and a lower one of said two tines being located near the lower side of said holder, said fastening portion being inclined with respect to the soil working portion of said rigid tine, and the soil working portion extending in trailing position relative to the normal direction of rotation of the corresponding soil working member, said fastening means including a plate that clamps the upper further tine to the holder.

8. An implement as claimed in claim 7, wherein each of said two tines has at least one corresponding coil and the coils of the two tines are interconnected to one another.

* * * * *